March 4, 1930. E. P. GUMMO 1,749,280
TYING DEVICE
Filed May 16, 1929
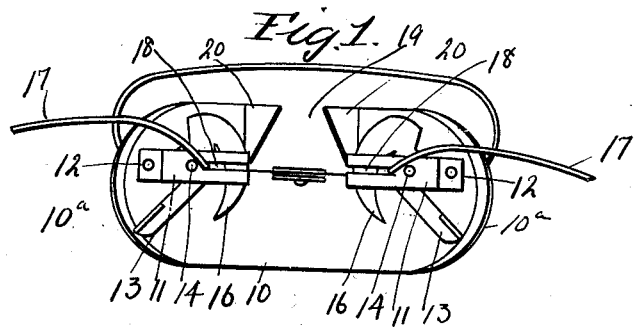
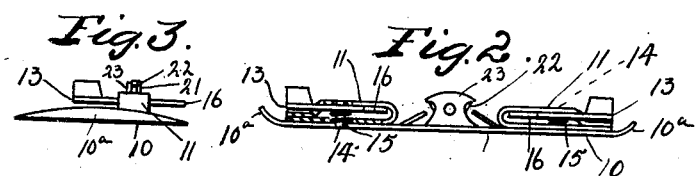
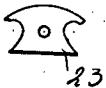
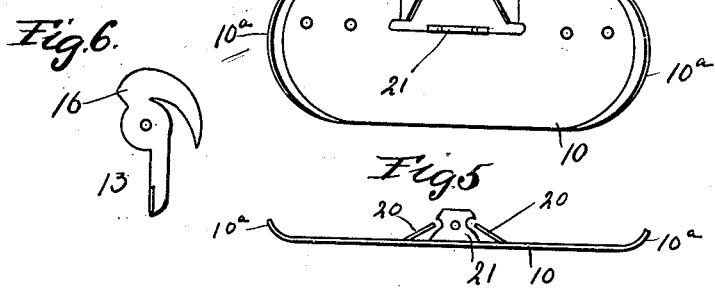
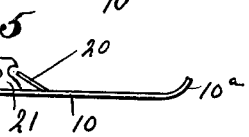
Inventor
Elmer Perry Gummo
By W. W. Williamson
Atty.

Patented Mar. 4, 1930

1,749,280

UNITED STATES PATENT OFFICE

ELMER PERRY GUMMO, OF MONUMENT, PENNSYLVANIA

TYING DEVICE

Application filed May 16, 1929. Serial No. 363,667.

My invention relates to new and useful improvements in tying devices and has for its object to provide an exceedingly simple and effective device of this description for facilitating the tying of twine around a shock or sheaf of grain, more especially corn shocks by the use of which the twine will be temporarily held around the shock while the ends of said twine are being tied.

A further object of the invention is to provide for the quick release of the twine after it has been tied and the removal of the device from the twine and shock.

With these and other ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:—

Fig. 1, is a plan view of a tying device made in accordance with my improvement.

Fig. 2, is a front edge view thereof.

Fig. 3, is an end edge view thereof.

Fig. 4, is a detail plan view of the plate upon which the operating parts are mounted.

Fig. 5, is an edge view of Fig. 4.

Fig. 6, is a detail view of one of the hook levers for temporarily holding the twine.

Fig. 7, is a detail view of the knife for cutting the twine.

Fig. 8, is a detail view of the guide for directing the twine to the knife.

In carrying out my invention as herein embodied, 10 represents the plate for mounting the operating parts of the device and this plate has its two ends slightly up-turned as indicated at 10ª for the purpose hereinafter set forth.

11 represents brackets in the form of sheet metal strips bent into U-shape, the outer portion thereof being riveted as indicated at 12 to the plate or otherwise secured thereto and within each of these brackets is pivoted the locking lever 13 by the stud 14 and upon this stud is coiled a small spring 15 embedded beneath the lever so as to normally force the lever against the under side of the upper portion of the bracket, thereby creating sufficient friction between the lever and bracket to prevent the latter from being accidentally moved from any adjustment in which it may be placed.

Formed with each lever is a sickle-shaped hook 16 for engaging the twine 17 and drawing the latter into place and holding it during the tying process.

Each of the brackets is slotted as indicated at 18, the slot in the upper portion extending nearer the pivot stud 16 than that portion of the slot in the lower portion of the bracket so that when the twine is inserted in the slot, that portion thereof which lies against he upper surface of the lower portion of the bracket will be drawn backward beneath the hook while that portion lying within the upper portion of the slot will be carried outward as the hook is brought into action, leaving the ends of the twine after both hooks have been put into action in the position represented in Fig. 1.

The plate 10 has a cut-out portion 19 and the wings 20 formed by this cut-out portion are turned upward as clearly shown in Fig. 2 and 5 so as to guide to the slots as will be readily understood.

21 represents a lug turned up from the plate 10 and against this lug is secured the knife 22 and the guide 23, thus locating the knife in convenient relation to that portion of the twine which is to be severed.

In practice, one end of the twine is secured in place by one of the locking hooks and the device carrying this end of the twine is passed around the shock when the other end of the twine is guided into the other slot and drawn taut by the swinging of the sickle-shaped hook of the other lever, after which the ends of the twine may be readily tied, that portion connected with the ball of twine being severed by drawing it against one of the edges of the knife. After this has been done, the locking hooks are released by the proper manipulation of the levers 13, thus freeing the plate as the twine will have been drawn through the opening in the plate.

I have found, in use, that this device greatly facilitates the tying-up of shocks and the like, producing a tighter binding and thereby saving twine and holding the shock in better condition and therefore keeping them in shape during rough handling.

As the device may be made entirely of sheet metal stampings and is easy to assemble, it may be manufactured at small cost.

Of course I do not wish to be limited to the exact details of construction as herein shown, as these may be varied within the limits of the appended claims without departing from the spirit of my invention.

Having thus fully described my invention, what I claim as new and useful is:—

1. In a device of the character described, a plate, brackets mounted upon said plate, said brackets having slots therein, levers pivoted within the brackets sickle-shaped hooks carried by the levers, said hooks adapted to draw twine outward in the slots and temporarily lock the same, and a knife having two cutting ends, said knife being so located as to be in ready reach of the ends of the twine held in the slots.

2. In a device of the character described, a plate, brackets secured upon said plate, each of said brackets having an upper and lower portion spaced apart, levers pivoted within the brackets, locking hooks formed with the levers for drawing twine outward within slots formed in the brackets, means for guiding twine to the slots in said brackets, and means located upon the plate for cutting the twine while locked in the device.

3. In a device of the character described, a plate having up-turned ends and also having up-turned wings, two brackets secured upon the plate, said brackets having slots therein so positioned relative to said wings as to facilitate the guiding of twine to the slots, levers pivoted in the brackets, each lever having a locking hook formed therewith, a lug projecting upward from the plate, a knife secured upon said lug and a guide secured upon the knife for facilitating the cutting of the twine while held by the hooks.

In testimony whereof, I have hereunto affixed my signature.

ELMER PERRY GUMMO.